United States Patent [19]

Kang et al.

[11] Patent Number: 5,303,067
[45] Date of Patent: Apr. 12, 1994

[54] COMPUTER CONNECTION CIRCUIT IN FACSIMILE

[75] Inventors: Seung I. Kang, Seoul; Cha S. Dong, Seongnam-Si, both of Rep. of Korea

[73] Assignee: Sindo Ricoh Co., Ltd., Seoul, Rep. of Korea

[21] Appl. No.: 795,718

[22] Filed: Nov. 21, 1991

[30] Foreign Application Priority Data

Nov. 28, 1990 [KR] Rep. of Korea ............... 1990-19412

[51] Int. Cl.⁵ ............................................ H04N 1/32
[52] U.S. Cl. .................... 358/442; 358/468; 395/114
[58] Field of Search ............... 358/442, 468; 395/114, 395/325

[56] References Cited

U.S. PATENT DOCUMENTS

| | | |
|---|---|---|
| 3,830,962 | 9/1974 | Mailoux . |
| 4,613,877 | 9/1986 | Spencer et al. ............ 358/481 |
| 4,652,933 | 3/1987 | Koshiishi . |
| 4,965,676 | 10/1990 | Ejiri et al. ................. 358/406 |
| 4,991,200 | 2/1991 | Lin ............................. 379/100 |
| 4,996,707 | 2/1991 | O'Malley, et al. ......... 379/100 |
| 5,021,892 | 6/1991 | Kita et al. .................. 358/468 |

OTHER PUBLICATIONS

Co-pending patent application Serial No. 07/778,465.
Co-pending patent application Serial No. 07/778,460.
Co-pending patent application Serial No. 07/778,459.
Western Digital Application Report #1: TR1402A Asynchronous Receiver/Transmitter, Oct. 1972.

*Primary Examiner*—Edward L. Coles, Sr.
*Assistant Examiner*—Scott A. Rogers
*Attorney, Agent, or Firm*—Darby & Darby

[57] ABSTRACT

The invention provides a computer connection circuit in a facsimile, comprising: control and memory unit including CPU(Central Processing Unit)(11a), RAM(-Random Access Memory)(11c), and ROM(Read Only Memory)(11b) for controlling a general operation control of the facsimile; address decoder 12 connected to the control and memory unit through an address bus, for selecting and enabling an output terminal according to an input address; a modem 31 connected to the control and memory unit through a date bus and connected to communication lines, in which is driven by a first chip selection signal of the address decoder 12 and requires an interrupt to the control and memory unit in sending/receiving image information; and an UART5-1(Universal Asynchronous Receiver & Transmitter) connected to the control and memory unit and to RS232C interface means of the computer, in which requites an interrupt to the control and memory unit in sending/receiving image and character information to/from the computer and is driven by a second chip selection signal of the address decoding decoder 12.

1 Claim, 2 Drawing Sheets

COMPUTER CONNECTION CIRCUIT IN FACSIMILE

BACKGROUND OF THE INVENTION

The present invention relates to a computer connection circuit in a system combining a facsimile device and a computer.

Recently, the document and image processing system combining the facsimile device and the computer is being developed in order to process the character together with image information within the system.

The proposals described hereto have been fixed in adding very expensive external device between the facsimile device and the computer.

SUMMARY OF THE INVENTION

It is an object of the invention to provide a computer connection circuit necessary to combine directly the facsimile device and the computer.

To achieve the object, the invention provides a computer connection circuit in a facsimile, comprising: control and memory means including CPU(Central Processing Unit), RAM(Random Access Memory), and ROM(Read Only Memory) for controlling a general operation control of the facsimile; address decoding means connected to the control and memory means through an address bus, for selecting and enabling an output terminal according to an input address; a modem connected to the control and memory means through a date bus and connected to communication lines, in which is driven by a first chip selection signal of the address decoding means and requires an interrupt to the control and memory means in sending/receiving image information; and an UART(Universal Asynchronous Receiver & Transmitter) connected to the control and memory means and to RS232C interface means of the computer, in which requites an interrupt to the control and memory means in sending/receiving image and character information to/from the computer and is driven by a second chip selection signal of the address decoding means.

BRIEF DESCRIPTION OF THE DRAWINGS

The above and other objects, features and other advantages of the present invention will be more clearly understood from the following detailed description taken in conjunction with the accompanying drawings in which.

DETAILED DESCRIPTION OF THE PREFERRED EMBODIMENTS

Figure 1:
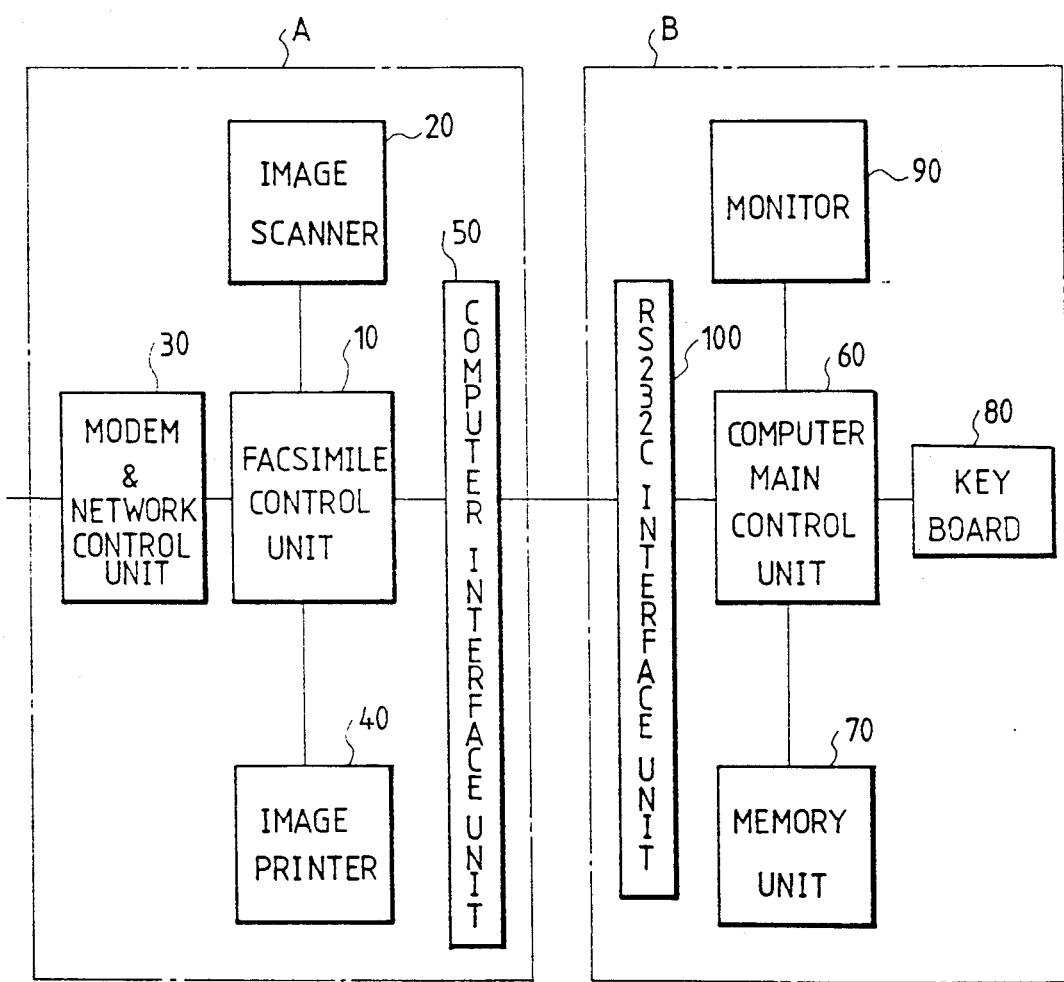
FIG. 1 is a block diagram of showing a connection system between the facsimile device and the computer.

FIG. 1 is a block diagram for showing a connection of a computer and a facsimile device to which this invention is applied, and in FIG. 1, the reference symbol A shows the facsimile device, B the computer, 10 a facsimile control unit, 20 an image scanner, 30 a modem and network control unit, 40 an image printer, 50 a computer interface unit, 60 a computer main control unit, 70 an external memory unit, 80 a key board, 90 a monitor, and 100 a RS232C interface unit, respectively.

As shown in FIG. 1, the facsimile device(A) is composed of the image scanner 20 inputting an image information, the image printer 40 printing out the image information, the modem and network control unit 30 sending and receiving the image information to and from the network line, the facsimile control unit 10 controlling generally the system operation, and the computer interface unit 50 connecting the facsimile device and the computer.

The computer system(B) is composed of the computer main control unit 60 corresponding to generally the computer body, the external memory unit 70 storing the image information as the floppy disc driver(FDD) or the hard disc driver(HDD), the key board 80 inputting the document and control information, the monitor 90 displaying the image information, and the RS232C interface unit 100 connecting the computer to other equipments.

The interface system in this invention can be formed by adopting the parallel interface using GPIB(General Purpose Interface Bus), and however adopts the asynchronous serial interface using the RS232C interface.

Figure 2:
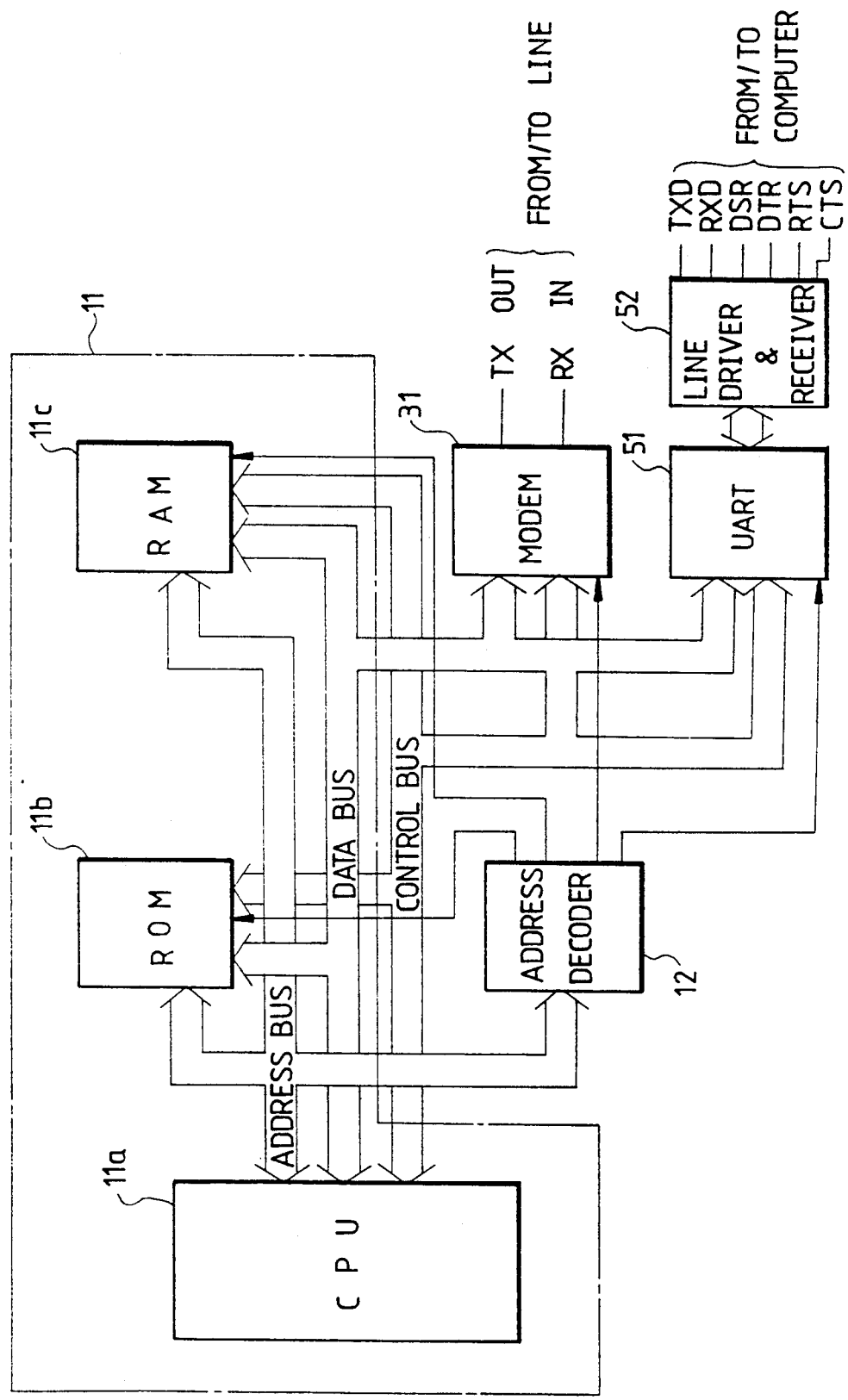
FIG. 2. is a schematic diagram of the major parts of FIG. 1.

FIG. 2 is a schematic diagram of an embodiment of the major parts of the facsimile device, and in FIG. 2, the reference number 11 shows a control and memory unit, 11a shows CPU(Central Processing Unit), 11b ROM(Read Only Memory), 11c RAM(Random Access Memory), 12 an address decoder, 31 a modem, 51 UART(Universal Asynchronous Receiver Transmitter), and 52 a line driver and receiver.

The UART 51 is used for processing effectively the RS232C connection to and from the computer. In the embodiment, the control and memory unit 11 and the UART 51 are connected in series for processing effectively the image information being transmitted to the communication line and the image information and the character information being transmitted to the computer.

The CPU 11a of the control and memory unit 11 is a processing unit for controlling the general operation of the facsimile device, and the ROM 11b is connected to the CPU 11b by the address bus, the data bus, and the control bus. The ROM 11b is composed of the 256 k EPROM in this embodiment as the expansive memory, but can be separately composed of the program ROM and the font ROM. The RAM 11c is connected to the CPU 11a by the address bus, the data bus and the control bus, and is composed of the 256 k SRAM as the expansive memory. The CPU 11a, the ROM 11b, and the RAM 11c can be replaced with one chip CPU in other embodiments, and at this time, in case of requiring the additive buffer memory, the RAM can be used additively.

The modem 31 is connected to the data bus and the control bus and performs the connection function to and from the communication line. The UART 51 is connected to the data bus and the control bus and performs the connection function to and from the computer.

The address decoder 12 is connected to the address bus at the input terminal thereof, and to the ROM, the RAM, the modem and the UART at the output terminal thereof, and then selects the ROM, the RAM, the modem or the UART according to the value of the address.

The line driver and receiver 52 performs the voltage transformation for connecting to the RS232C interface unit 100 of the computer. The line driver and receiver 52 comprises the 1488 or 1489 IC, providers the voltage 12 V with the RS232C interface unit of the computer after transforming the output voltage(0 V,5 V) from the UART 51 to the voltage 12 V, or provides the voltage(0 V, 5 V) with the UART 51 after transforming the output voltage from the RS232C interface unit to the voltage (0 V,5 V).

The CPU 11a of the control and memory unit 11 alternatively checks and detects the state of the modem 31 and the UART 51 by controlling periodically the chip selection of the address decoder 12, and then processes the requirement of the particular control information that decides to send the image information through the modem 31 or through the UART 51. Accordingly, an interrupt is used in transmitting said information, and when the requirement of said information transmission is produced at the same time, the information to and from the communication line is processed preferentially.

Each signal terminal of the computer interface unit 50 uses TXD, RXD, DSR, DTR, RTS, CTS, GND terminals recommended in CCITT V24, and its wiring technique in 25 pins RS232C port or 9 pins RS232C port is shown at the following TABLE 1.

TABLE 1

| 25 pins RS232C port | | 9 pins RS232C port | |
| --- | --- | --- | --- |
| FACSIMILE | COMPUTER | FACSIMILE | COMPUTER |
| TXD(2) | RXD(3) | TXD(2) | RXD(2) |
| RXD(3) | TXD(2) | RXD(3) | TXD(3) |
| DSR(4) | DTR(20) | DSR(4) | DTR(4) |
| DTR(6) | DSR(6) | DTR(6) | DSR(6) |
| CTS(7) | RTS(4) | CTR(7) | RTS(7) |
| RTS(8) | CTS(5) | RTS(8) | CTS(8) |
| GND(5) | GND(7) | GND(5) | GND(5) |

What is claimed is:

1. A computer connection circuit in a facsimile device, for directly connecting a computer having an RS232C interface unit to the facsimile device, said facsimile device having an image scanner and an image printer, said connection circuit comprising:

control and memory means including a CPU (Central Processing Unit), a RAM (Random Access Memory) and a ROM (Read Only Memory) for controlling a general operation control of the facsimile device;

address decoding means connected to said control and memory means through an address bus, for selecting and enabling an output terminal according to an input address;

a modem connected to said control and memory means through a data bus and connected to communication lines, whereby said modem is driven by a first chip selection signal received from said address decoding means and requires an interrupt to be applied to said control and memory means in sending/receiving image information;

an UART (Universal Asynchronous Receiver & Transmitter) directly connected to said control and memory means through the data bus, whereby said UART requires an interrupt to be applied to the control and memory means in sending/receiving image and character information to/from the computer and said UART is driven by a second chip selection signal received from said address decoding means;

line driving and receiving means connected to said UART and connected to the RS232C interface unit of the computer, for performing a voltage transformation between said UART of the facsimile and the RS232C interface unit of the computer; and wherein said control and memory means alternatively checks and detects a state of said modem and said UART by periodically controlling the chip selecting operation of said address decoding means, and preferentially processing information to and from said modem.

* * * * *